Figure 1:
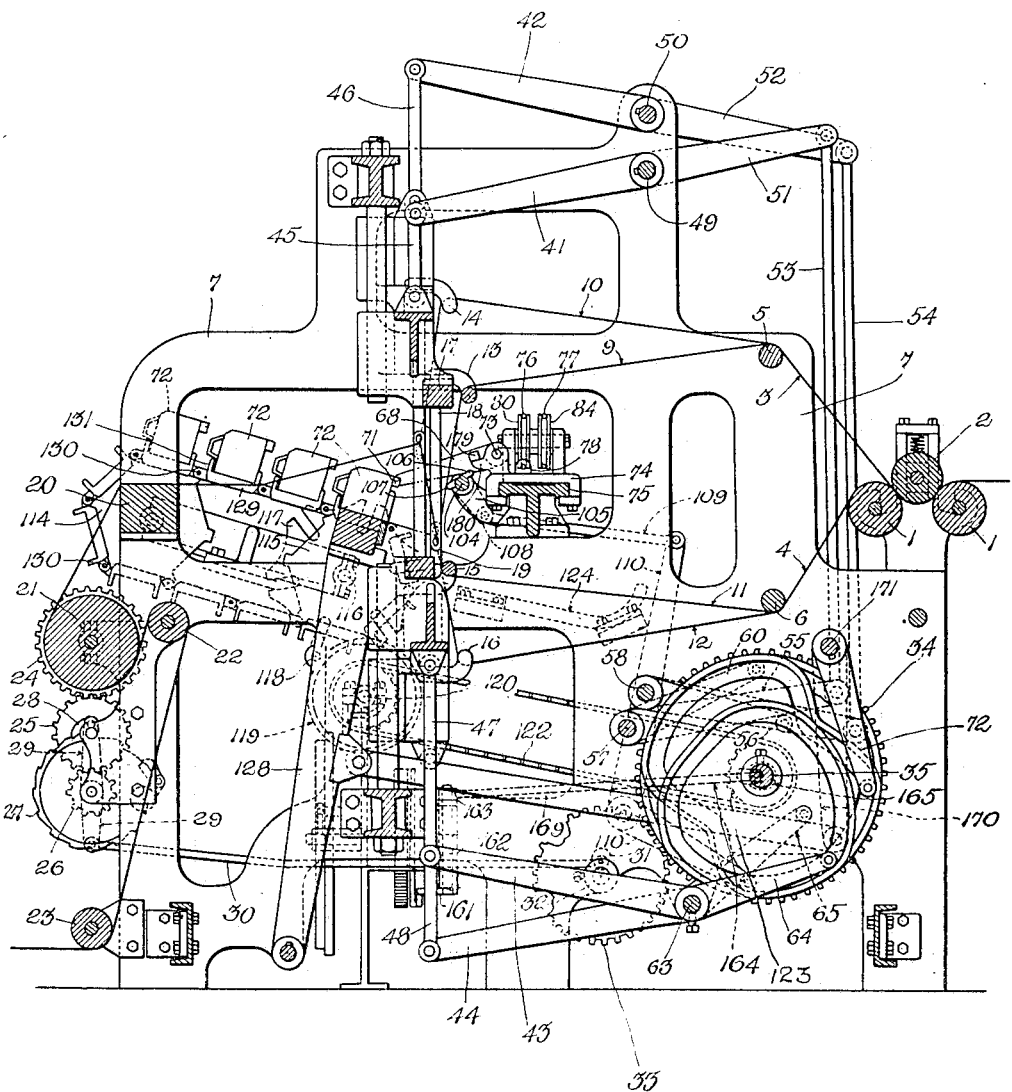

T. P. WALSH.
AUTOMATIC POSITIVE SHUTTLE LOOM FOR HEAVY WEAVING.
APPLICATION FILED DEC. 19, 1910.

1,121,696.

Patented Dec. 22, 1914.

10 SHEETS—SHEET 1.

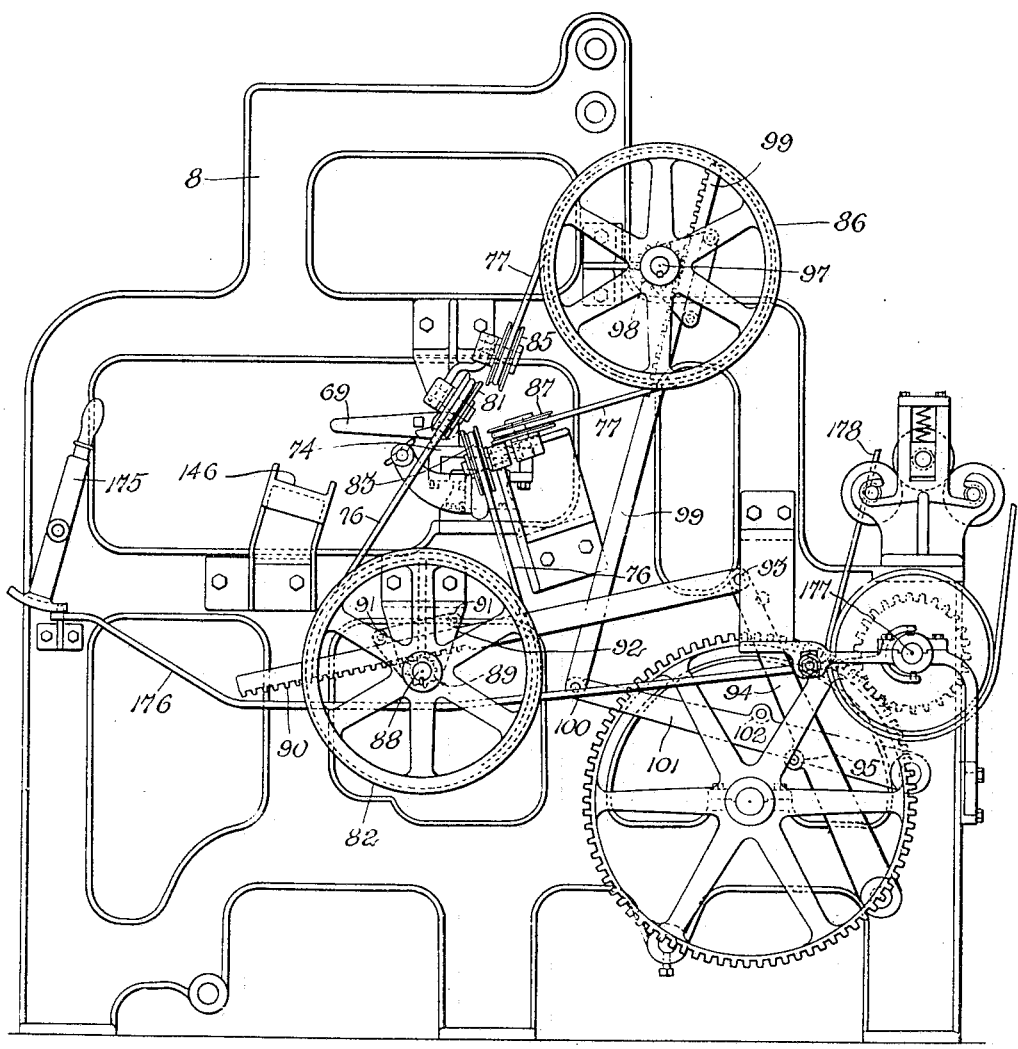

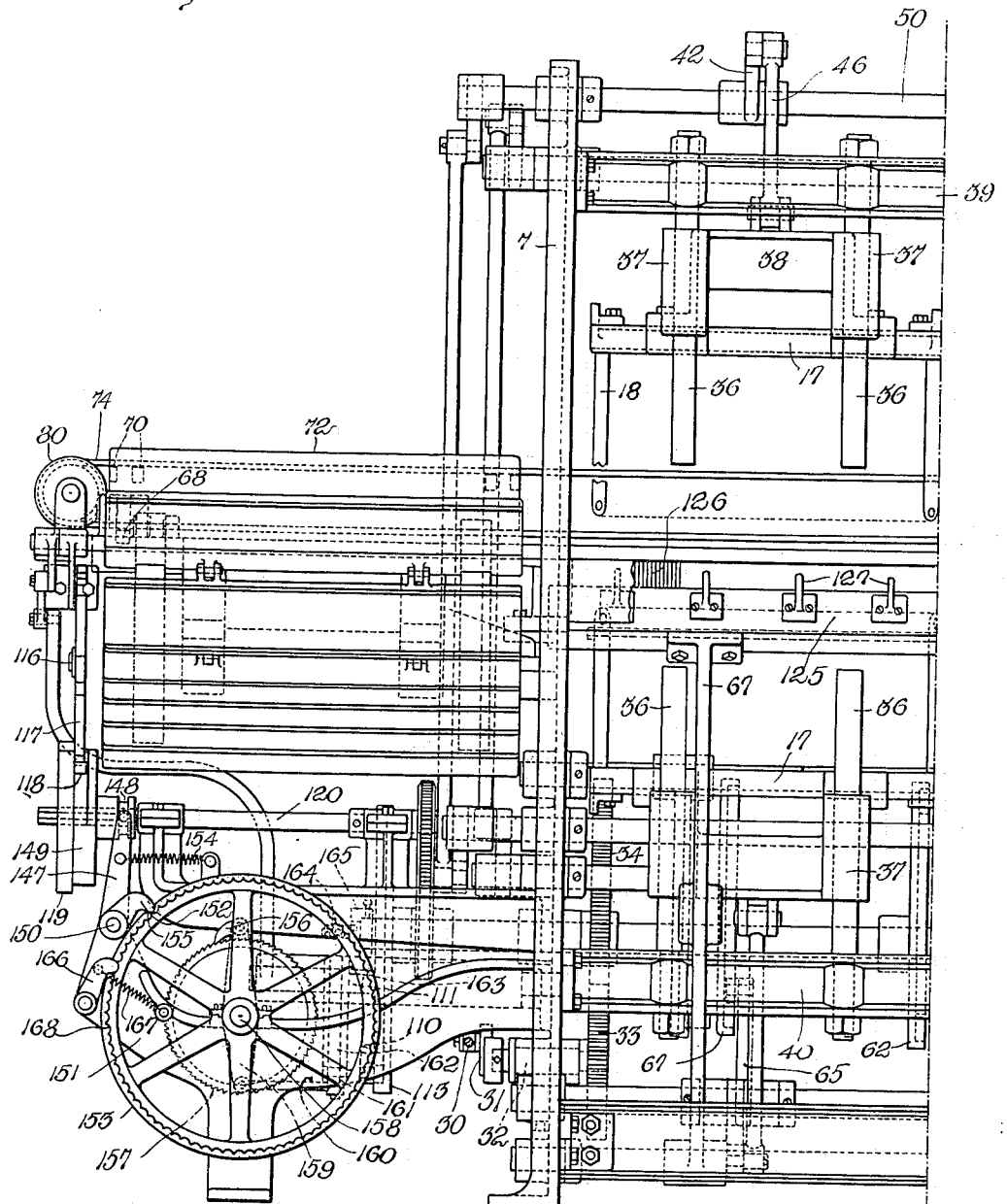

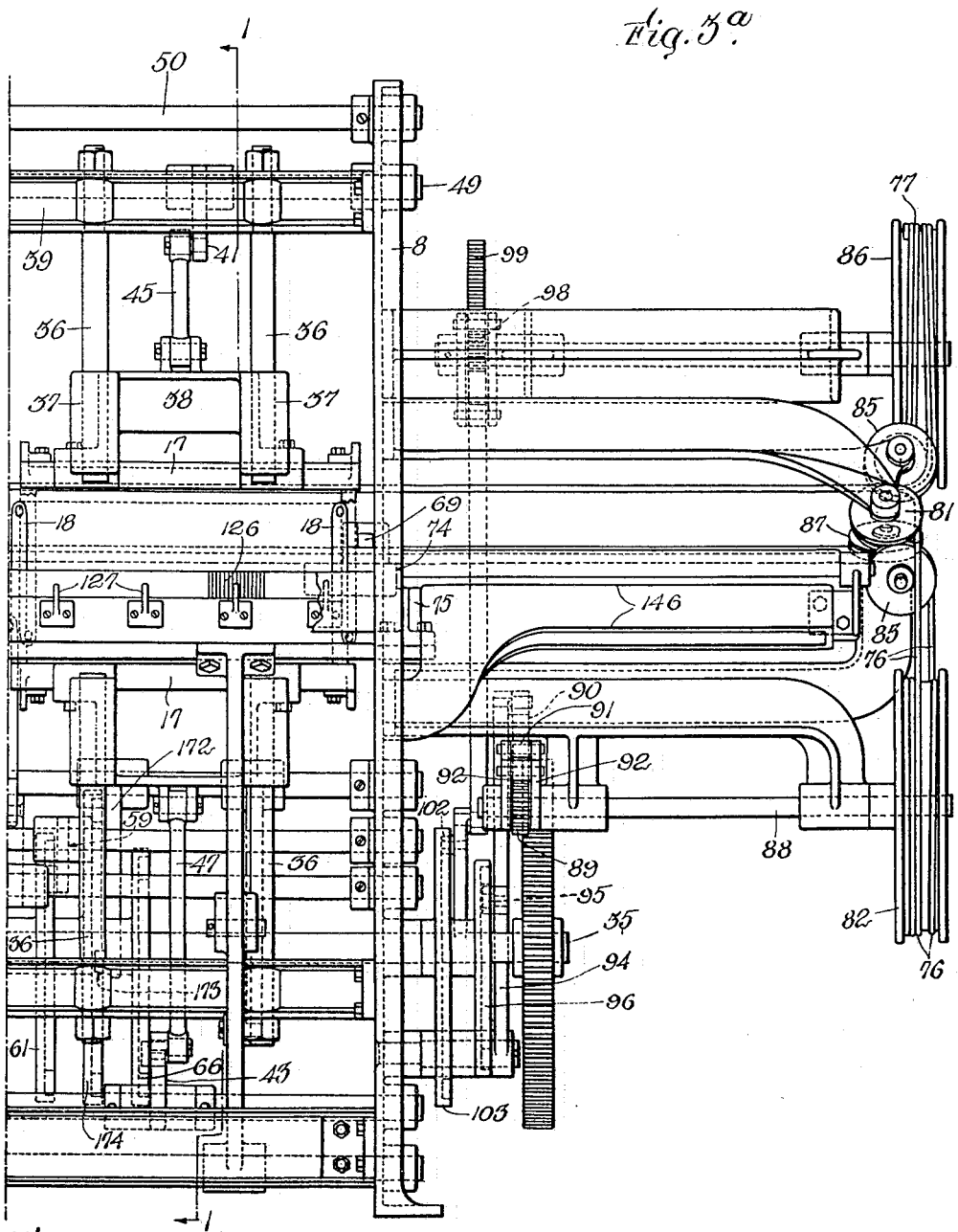

T. P. WALSH.
AUTOMATIC POSITIVE SHUTTLE LOOM FOR HEAVY WEAVING.
APPLICATION FILED DEC. 19, 1910.
1,121,696.
Patented Dec. 22, 1914.
10 SHEETS—SHEET 5.
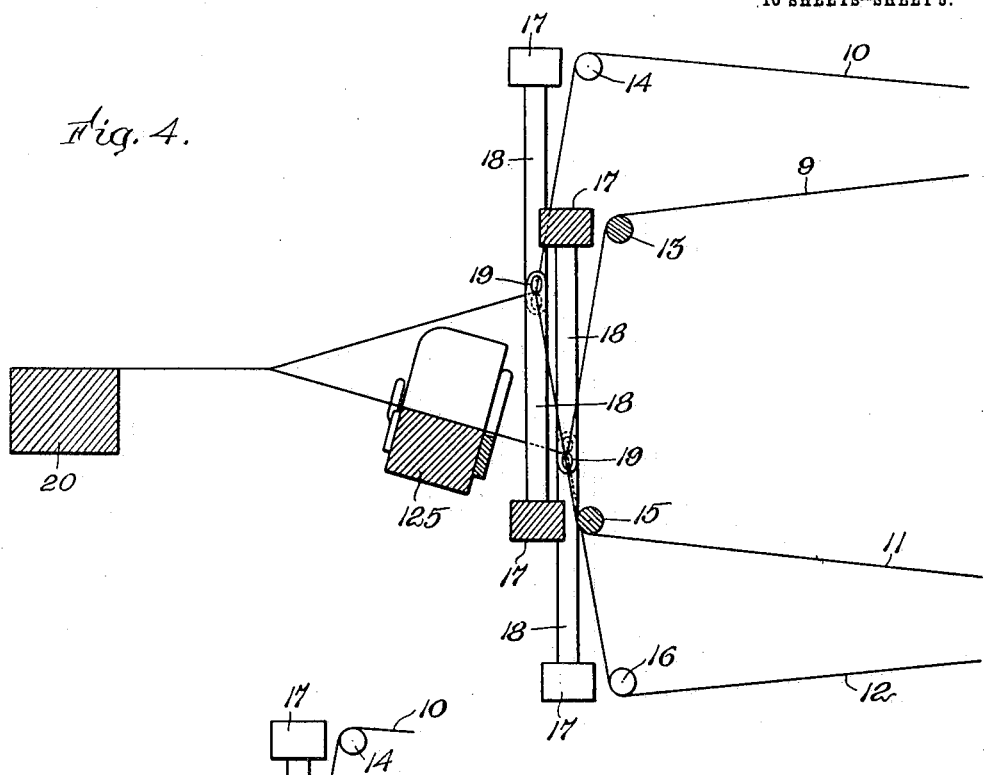
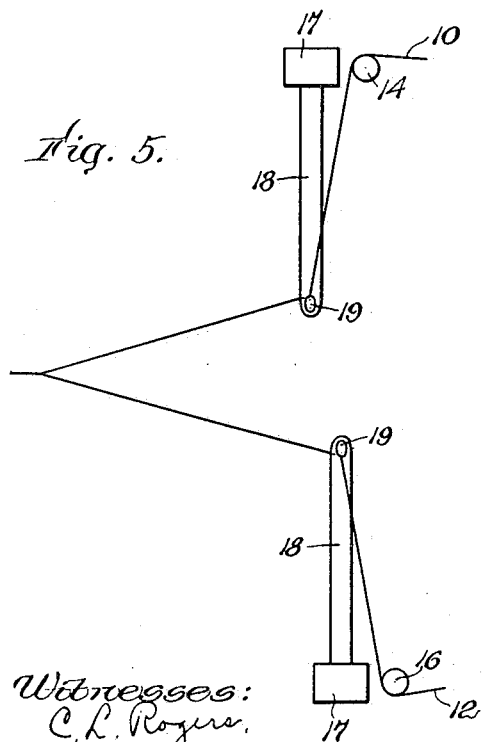
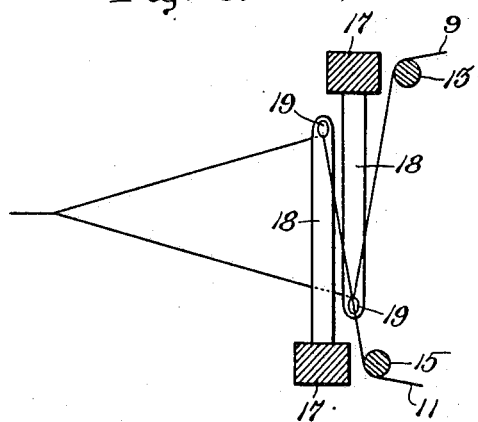
Witnesses:
C. L. Rogers.
Edward Maxwell
Inventor:
Thomas P. Walsh,
by Geo. H. Maxwell,
Attorney.

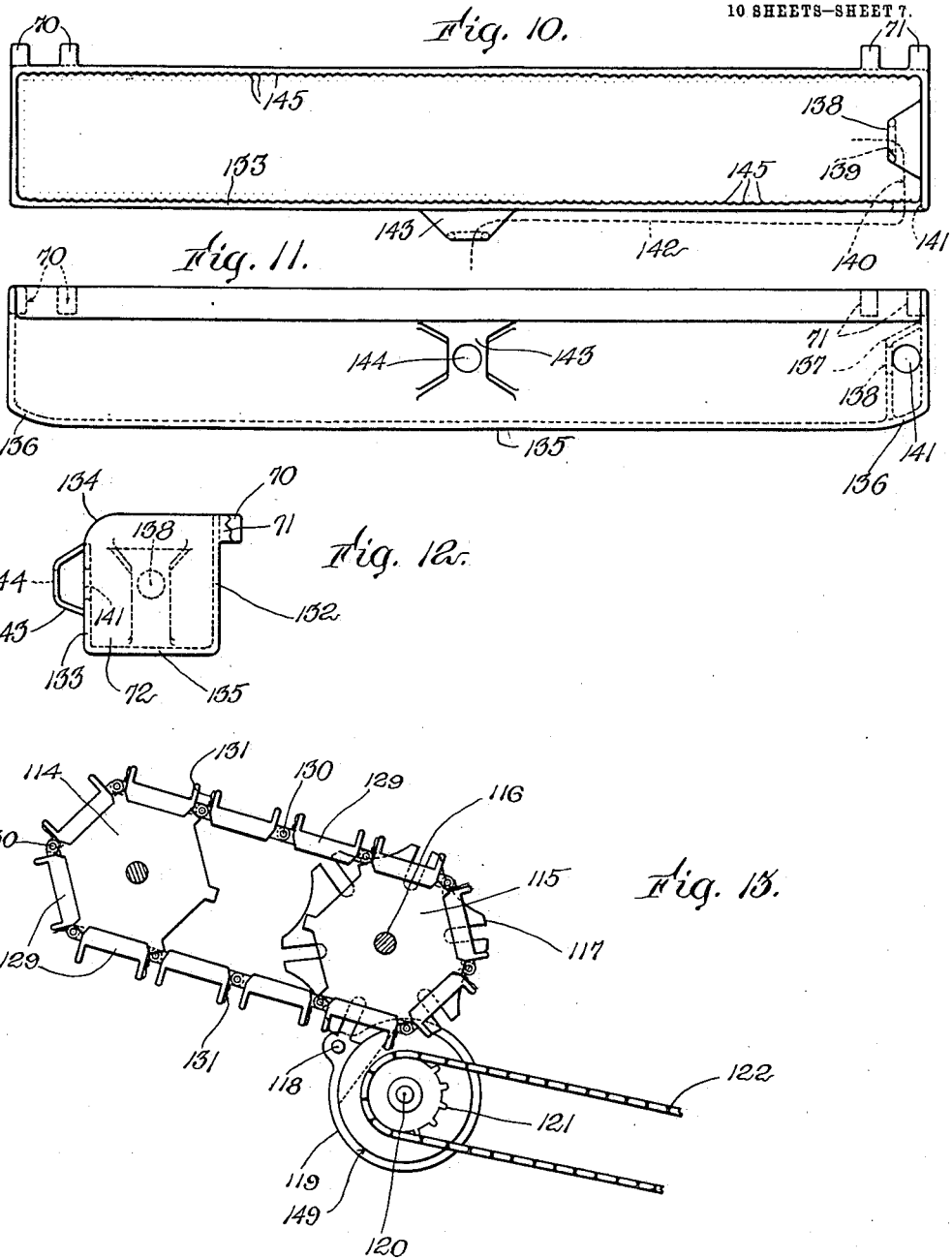

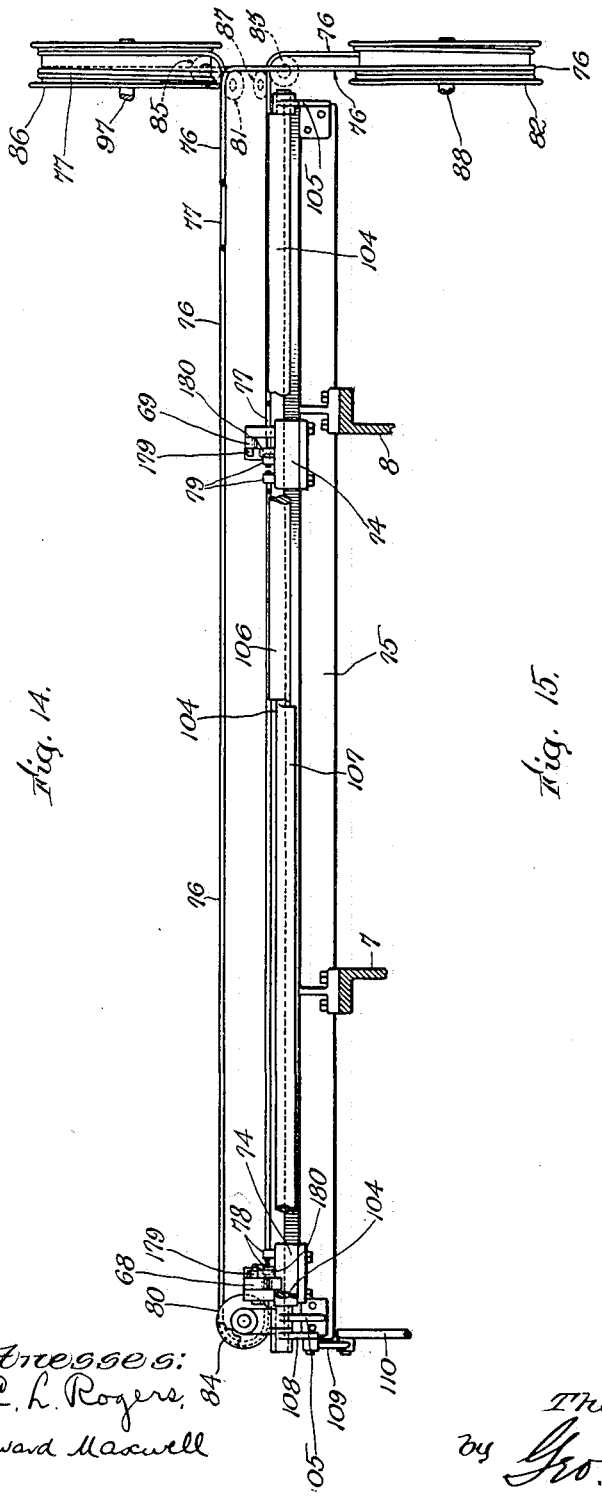
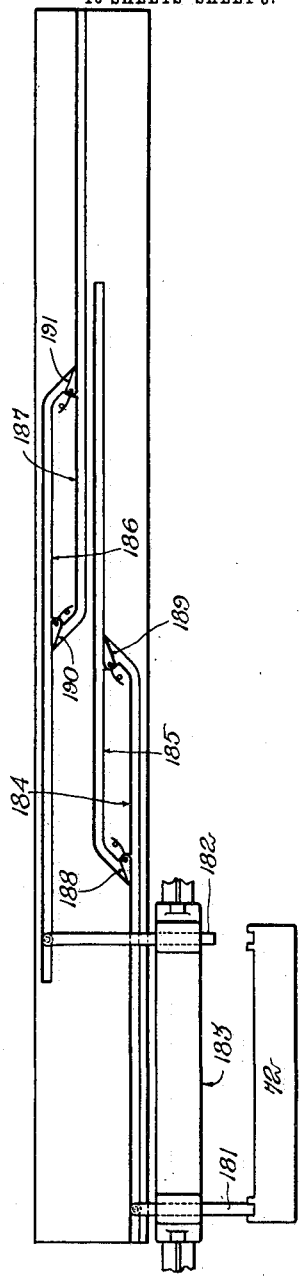

T. P. WALSH.
AUTOMATIC POSITIVE SHUTTLE LOOM FOR HEAVY WEAVING.
APPLICATION FILED DEC. 19, 1910.

1,121,696.

Patented Dec. 22, 1914.

10 SHEETS—SHEET 9.

Witnesses:
C. L. Rogers.
Edward Maxwell

Inventor:
Thomas P. Walsh,
by Geo. J. S. Maxwell,
Attorney.

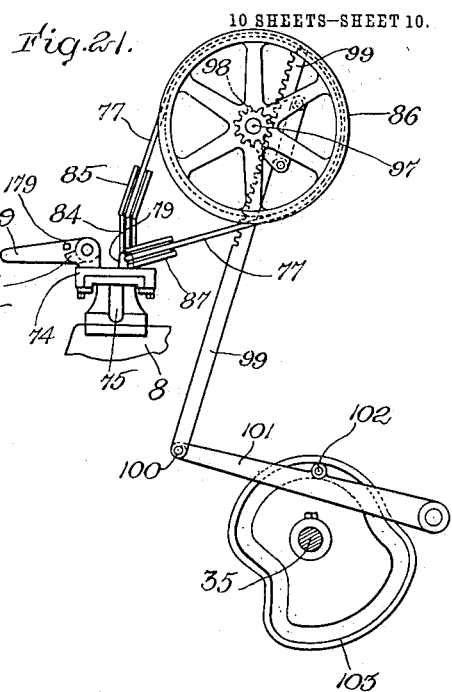

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

AUTOMATIC POSITIVE-SHUTTLE LOOM FOR HEAVY WEAVING.

1,121,696.

Specification of Letters Patent.

Patented Dec. 22, 1914.

Application filed December 19, 1910. Serial No. 598,244.

*To all whom it may concern:*

Be it known that I, THOMAS P. WALSH, a citizen of the United States, and resident of Boston, in the county of Suffolk and State of Massachusetts, have invented an Improvement in Automatic Positive - Shuttle Looms for Heavy Weaving, of which the following description, in connection with the accompanying drawings, is a specification, like letters on the drawings representing like parts.

My present invention is an automatic loom for weaving such fabrics as gunny sacking, burlap, wire fabrics, heavy fiber belting, cocoa matting, etc. Heretofore one of the chief causes of expense and slow weaving of this class of goods has been due to the necessity for extremely frequent changes of shuttles, and also the additional frequent stoppages due to the breaking of the filling. This kind of filling is necessarily very uneven in size and twist, so that it is full of weak places and will not move smoothly through the shuttle eye, and the ordinary shuttle will only receive a short amount of the filling (because of its cumbersomeness when wound), and on account of the further necessity of a close short wind of the filling on the cop, the quick snap which the picker stick gives the shuttle gives a tendency to kink the filling and lock it in the eye of the shuttle and thereby frequently to break the filling. This in addition to the frequent stoppages due to the running out of the short strands of filling. Also, when the filling is extra resistant or stiff (as where the filling consists of a wire or of fiber twisted with a wire or wires), it has been found impracticable to attempt to weave anything but a very narrow fabric.

Accordingly, my invention aims to provide a loom capable of weaving a wide fabric and of accomplishing said weaving automatically in connection with a shuttle changing mechanism and positive shuttle drive whereby the above objections are all practically eliminated. The shuttle drive gives a steady, even movement of the shuttle in its entire traverse, thereby avoiding the snapping drive of the picker stick and the kinking tendency and other objections mentioned. It also accommodates one size of filling practically as well as any other size or strength.

My invention also includes a special harness motion and special style of shuttle, the latter permitting a very large supply of filling on each shuttle (as compared with the present shuttles for this kind of weaving), and the former coöperating to permit the shedding movement without bringing any particular strain on the warp threads and also aiding materially in permitting a relatively small mechanism for the shuttle movement.

The constructional details of the loom will be further explained in the course of the following detailed description, taken in connection with the accompanying drawings, in which I have shown a preferred embodiment of the invention.

Figure 7:
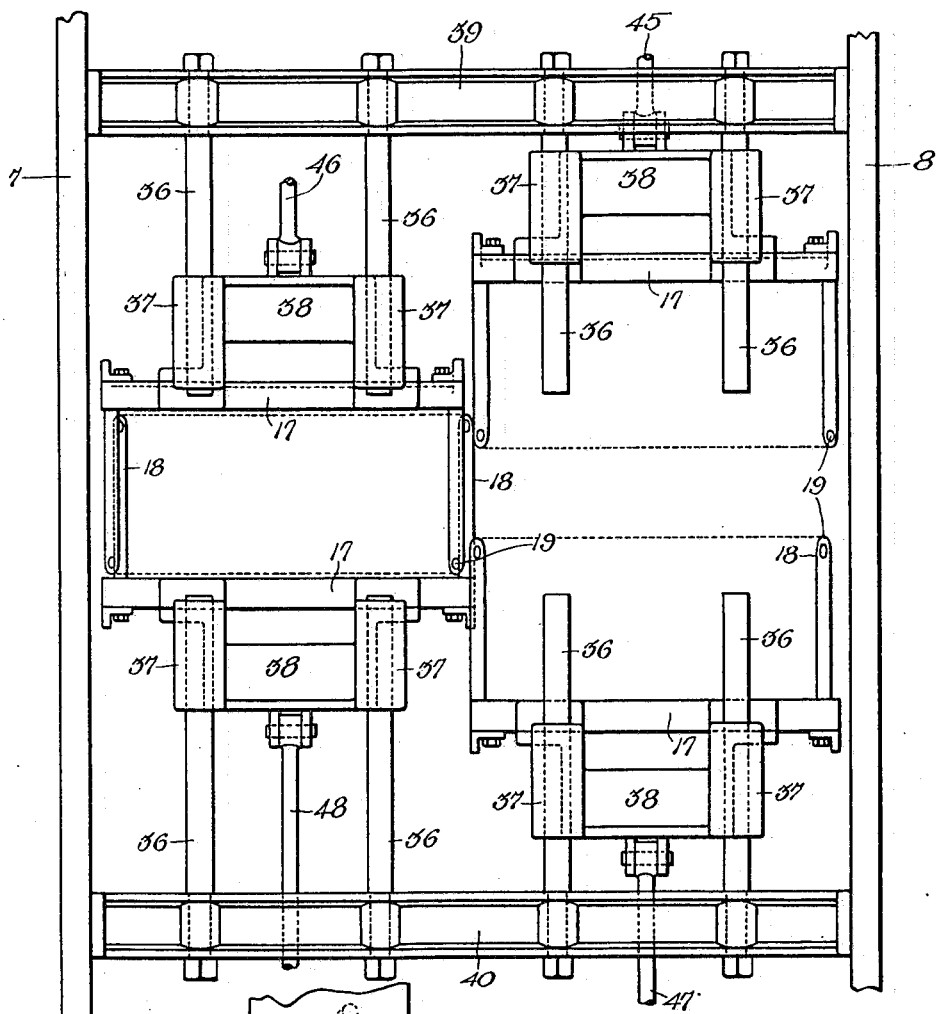
Figure 8:
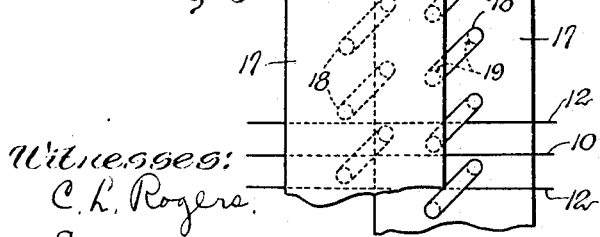
Figure 9:
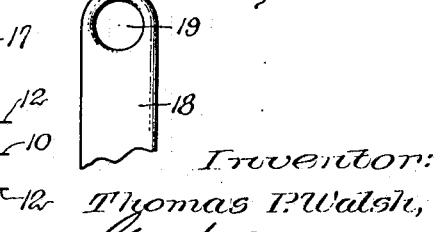
Figure 16:
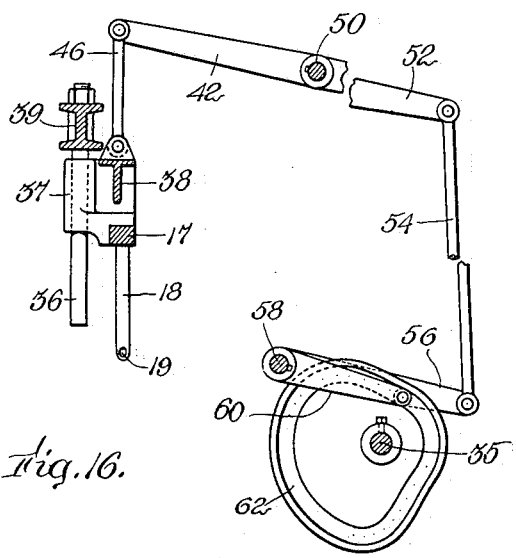
Figure 17:
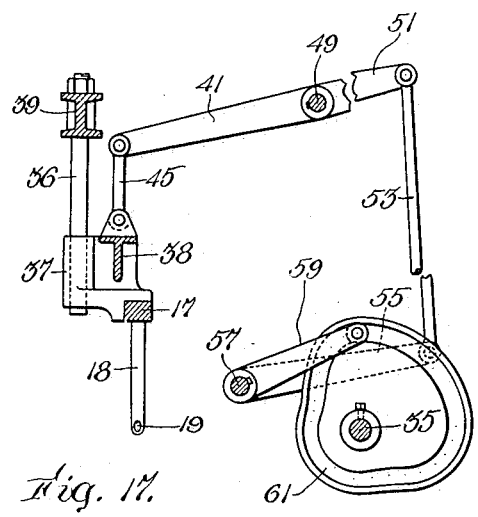
Figure 18:
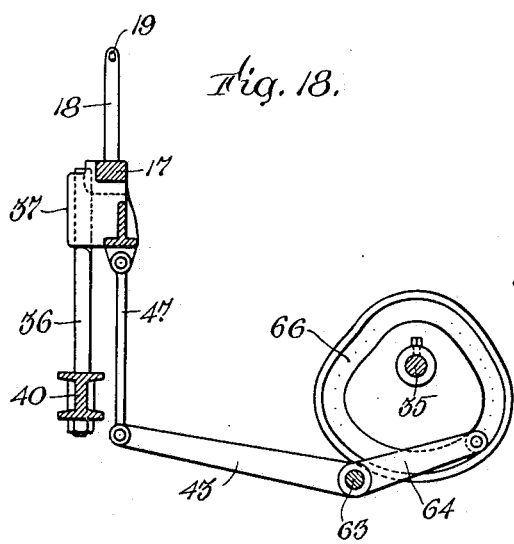
Figure 19:
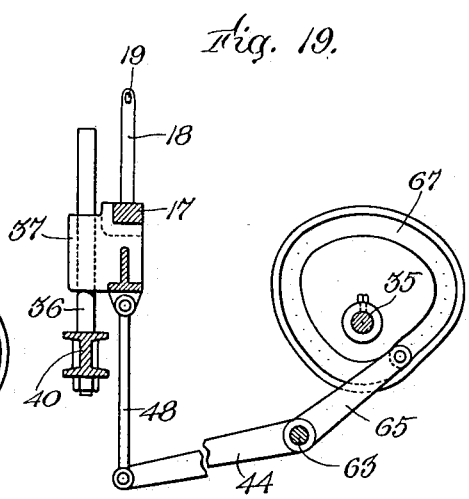

In the drawings, Figure 1 is a longitudinal vertical sectional view taken on the dotted line 1—1, Fig. 3ª; Fig. 2 shows the loom in right hand end elevation; Figs. 3 and 3ª are views in front elevation of portions of the loom, the take-up being omitted and the breast beam partly broken away for clearness of illustration; Fig. 4 is a sectional view similar to Fig. 1 showing simply the harness arrangement in its relation with certain adjacent parts; Figs. 5 and 6 are diagrammatic views or fragmentary side elevation showing respectively the open shed position and the crossed shed position of the harnesses and warp threads; Fig. 7 is a front elevation of the harness mechanism shown in a reversed position from Figs. 3 and 3ª; Fig. 8 is a fragmentary view in top plan of the two harnesses; Fig. 9 is a fragmentary detail, in front elevation of the free end of one of the harness fingers; Figs. 10, 11, and 12 are views respectively in top plan, front elevation, and right hand end elevation of one of the shuttles; Fig. 13 is a view similar to Fig. 1 of the shuttle changing mechanism; Fig. 14 is a fragmentary view in front elevation of the traversing mechanism for the shuttle; Fig. 15 is a plan view, largely diagrammatic, of a modified construction of shuttle actuating mechanism; and Figs. 16–23 are views in elevation of the various cams, Fig. 16 showing the cam for controlling the upper left hand harness, Fig. 17 for controlling the upper right hand harness, Fig. 18 for controlling the lower right hand harness, Fig. 19 for controlling the lower left hand harness, Fig. 20 for controlling the left hand shuttle actuator, Fig. 21 for controlling the right hand shuttle actuator, Fig. 22 for actuating the shuttle actuator lifters, and Fig. 23 for actuating the lay.

The warp threads are led from a usual source of supply, such as a creel (not shown), between let-off rolls 1, 2, and are thence divided into an upper group 3 and a lower group 4, passing respectively over guide bars 5, 6 supported in the end frames 7, 8. At this point the two sets of warp threads are respectively divided into two groups, viz. an upper right hand group 9 (i. e. at the right hand end or half of the loom), and an upper left hand group 10, a lower right hand group 11, and a lower left hand group 12, which pass respectively over warp thread guide bars 13, 14, 15, 16 which move vertically with, and are preferably carried by, the harness mechanisms. According to this preferred form of my invention which I am now describing, there are four harnesses, set substantially end to end across the loom, each extending halfway, or rather half the distance of the width of the fabric, two of these harnesses being operated from above the point of weaving and two from below said point, and the right hand upper and lower harnesses moving toward each other when the left hand upper and lower harnesses move away from each other, and vice versa. As all of these harnesses are alike, a description of one will suffice for all. From a cross beam 17 extend thread carrier fingers 18 having eyes 19 at their free ends through which the warp threads are passed and thence led over a breast beam 20 to a take-up roll 21 and guide rolls 22, 23, said take-up roll being operated in usual manner by gears 24, 25, 26, ratchet 27, pawl 28, rocker arm 29, connector 30, and cup crank 31 from a shaft 32 driven by gears 33, 34 from the main cam shaft 35. In order to accommodate the large warp threads used in this loom, the thread-eye fingers 18 are set obliquely to the length of the loom, as best shown in Fig. 8, thereby making it possible to have a large eye 19 for permitting the yarn to go in a substantially straight direction lengthwise of the loom through said obliquely set eyes and yet leave space between the successive fingers for the alternate yarns or warp threads. The setting of the arms obliquely also adds to their resistance in the direction of the length of the loom. To facilitate the movement of the yarn, the edges of these fingers are rounded so that the sides of the eye 19 are rounded both on the inside of the eye and on the outside of the eye, as clearly shown in Figs. 8 and 9. Each harness is guided in truly vertical movement by guide studs 36, there being preferably two for each harness, working in slideways or guide tubes 37 secured to the cross beam 17 and preferably connected by a web 38 for giving accuracy of movement and strength of position, these supporting parts of the harness fingers constituting a harness frame. The guide studs 36 are carried by cross carriers, the upper studs by a cross carrier 39 and the lower studs by a cross carrier 40 bolted rigidly to the end frames 7, 8 of the loom. The free ends of the guide studs terminate adjacent to the shedding position of the warp threads, but out of possible interference therewith and forward of the harness frames, as best shown in Fig. 1. The respective harness frames are operated by cranks or levers 41, 42, 43, 44 connected to their respective harness frames by links 45, 46, 47, 48. The upper levers 41, 42 are fast on rock shafts 49, 50 journaled in the end frames of the loom and actuated by rocker arms 51, 52 connected by rods 53, 54 to cranks 55, 56 whose shafts 57, 58 carry cam cranks 59, 60 operated by cams 61, 62. The lower levers 43, 44 which operate respectively the right hand lower harness and the left hand lower harness are in the form of bell cranks loosely mounted on a fixed shaft 63, said bell cranks having their respective rear ends 64, 65 actuated by cams 66, 67.

The shuttles, as already stated, are positively actuated. By positively actuated or positively driven, I mean to distinguish from a shuttle which is simply shot across the loom by an initial impulse and then left to take care of itself by its own momentum. This is the movement and operation given to what is known as a fly shuttle, which is impelled by a sudden severe blow from a picker stick, the result being that the yarn is brought under extreme snapping strain at the beginning of the movement, which movement is extremely rapid at the start and diminishes as the shuttle proceeds across the loom. My shuttle drive is distinguished from this, by having a continuous and uniform driving impulse imparted thereto throughout the entire traverse, by the direct and continuous engagement with the shuttle of driving or moving means throughout the entire travel of the shuttle from one edge of the fabric to the other. This eliminates all sudden strain upon the filling, and makes it possible to weave at relatively high speed such irregular bunchy, kinky, stiff material as is frequently used in weaving jute bagging, for instance. When, therefore, I refer in the claims to positively actuated or positively driven shuttle, I mean to restrict the same to the operation and mechanism as thus defined.

Any suitable means for engaging and operating the shuttle is within the scope of my invention, arms 68, 69 being herein shown for this purpose as arranged to drop between opposite pairs of lugs 70, 71, as best shown in Figs. 10-12, projecting rearwardly from the upper back side of the shuttle 72, and the shuttle itself is made slightly longer than one transverse section of the loom, *i. e.* slightly longer than one harness member. Mechanism is provided for causing these arms 68, 69 to move one at a time alternately into engagement with a shuttle, the arm 68 engaging between the lugs 70 at the proper time and the arm 69 engaging between the lugs 71 at a different time. Supposing that a shuttle starts from the left hand side of the loom, Figs. 3 and 3ª, the arm 68 will engage between the lugs 70 of said shuttle and at the same time start forward to the right, moving the shuttle ahead of it until the arm has reached approximately the middle of the loom, *i. e.* the right hand end of the left hand harness. This brings the forward end of the moving shuttle into operative position opposite the arm 69 which, up to this point, has not moved. Thereupon the arm 69 drops between the lugs 71 at the forward end of said shuttle 72, and simultaneously the arm 69 is disengaged from its position between the lugs 70. This movement takes place instantly without stopping the shuttle, and the forward movement thereof is simply continued by the arm 69, the other arm 68 stopping as the arm 69 starts. As the arm 69 is at the extreme right hand end of its harness section (the right hand section as herein shown), it is free to move forward to the extreme right, carrying the shuttle through the shed and entirely beyond the harness. The basic idea is to divide the loom harness widthwise into sections which shall be alternately open and crossed, and then provide means operating in the open section to pass the shuttle along and through the crossed shed into position to be engaged by another actuating means to pass the shuttle along again, the alternating open and crossed sheds being then reversed, whereupon the shuttle in its backward movement is operated in the same manner excepting that the actuating mechanism operates now where the warp threads were before crossed but are now open. As herein shown, the loom is divided into two sections only, and in this simple form of the invention the two actuating arms 68, 69 are loosely pivoted at 73 on similar carriages 74 mounted to reciprocate on a T-shaped cross track 75 fastened to the end frames 7, 8. These carriages are actuated respectively by cables 76, 77, the former being made fast to the left hand carriage at a bracket 78 and the latter to the right hand carriage at a bracket 79. The cable 76 passes from its carriage to the left beneath and around a sheave 80 (journaled in the support or stand fast on the extreme left hand end of the track 75) and thence to the right across the loom around a sheave 81 (mounted on a bracket secured to the end frame 8, Figs. 2, 3 and 3ª), and down to and several times around a winding drum 82, to which it is preferably fastened and thence passes upwardly and around a sheave or direction pulley 83 (whose supporting bracket is mounted rigidly on the end frame 8, Figs. 2, 3 and 3ª) and back to the lug 78. The cable 77 passes from its lug 79 to the left around a sheave 84, herein shown as mounted coaxially of the sheave 80 on the same journal bearing, and thence the cable 77 passes back across the loom to a sheave 85 (shown as on the same bracket as the sheave 81) and drum 86, which it passes around several times and to which it is preferably fastened, and from which it passes to a sheave or guide pulley 87 (shown as on the same bracket as sheave 83) and back to the securing bracket 79 on the right hand carriage. The drum 82 is fast on a relatively long shaft 88 on whose inner end is a pinion 89 engaged by a rack 90 which is guided and held in mesh by friction rolls 91 and plates 92. The rack 90 is pivoted at 93 to a cam lever 94 whose roll 95 is actuated by a cam 96 on the cam shaft 35. The drum 86 is similarly mounted and actuated, its shaft 97 having a pinion 98 meshing with a rack 99 pivoted at 100 to a cam lever 101 whose cam roll 102 is driven by a cam 103 on the shaft 35. The timing of these cams is such that the left hand carriage first moves the distance from the extreme left of the loom, Figs. 3, and 3ª to the middle, during which movement the right hand carriage is stationary, and thereupon the right hand carriage moves from its position as shown in Fig. 3ª to the extreme right. Meanwhile the left hand carriage is being moved from the middle of the loom (where it had delivered the shuttle to the right hand carriage) back toward the left just outside of the harness into a position corresponding, on that side of the loom, to the position in which the right hand carriage is shown in Fig. 3ª, where said left hand carriage halts. Then, while both carriages and the shuttle are outside of or beyond the harness, the shedding operation takes place and the lay beats up, the reverse shedding movement leaving an open shed on the right hand side of the loom and a crossed shed on the left hand, being just the opposite to the previous shedding position. Thereupon the right hand carriage moves back toward the left with the shuttle until said carriage is almost at the middle of the loom, whereupon the left hand carriage engages the forward end of the shuttle just outside of the left end of the crossed portion of the shed and takes the shuttle forward to the left into its original or starting position. Then follows another shedding and beating-up operation the same as before.

As a convenient means for alternately engaging and disengaging the shuttle actuator arms 68, 69 with the shuttle, I have provided a rock shaft 104 mounted transversely across the loom just beneath said arms and parallel to the travel of the carriages, preferably in brackets 105 adjacent the ends of the T-rail 75. The right hand half of said shaft is provided with a longitudinal wing 106, shown in Fig. 1 as projecting upwardly and rearwardly while the left hand half of said shaft is provided with a similar wing 107 projecting forwardly and downwardly, or opposite to the direction of wing 106. This shaft is rocked by a lever 108, link 109, bell crank 110 pivoted at 111 on the end frame 7 and having a cam roll 112 actuated by a path cam 113 on the shaft 35. Thus, when the actuator arm 68, for instance, is to engage the shuttle, the rock shaft 104 is rocked to the position shown in Fig. 1, so that its wing 107 is out of supporting relation to the arm 68, the opposite wing 106 being thereby necessarily moved into position for simultaneously moving and maintaining the arm 69 out of operative position, and when the arm 69 is to be engaged with the shuttle, the rocking of said shaft 104 to the opposite position by the forward movement of its crank 108 simultaneously reverses the position of these wings, so that as the wing 106 lowers to permit its arm 69 to come down into shuttle-engaging position, the wing 107 at the same time rises to disengage its arm 68 from said shuttle. I prefer this construction because it is not only quick, but there can be no mistake of timing, inasmuch as the lifting of one controlling wing necessarily depresses the other controlling wing and vice versa.

A further important feature of my invention, as already explained, resides in providing, in connection with this heavy-fabric weaving mechanism, an automatic positive shuttle-changing mechanism, whereby, notwithstanding the relatively large size of the shuttles and comparatively unmanageable character of the filling, a new shuttle will be automatically placed in weaving position and the old shuttle removed. Notwithstanding that the shuttle is positively driven, I have succeeded in rendering it possible to remove automatically this shuttle and replace it with another shuttle to be similarly positively driven. Preferably (especially in view of the character of the filling being handled) this shuttle changing mechanism operates at predetermined intervals so that, for instance, whenever one hundred and seventy six shots of filling have been laid, and the shuttle thereby emptied of the predetermined length of filling with which it was originally provided, a new shuttle will be brought into weaving position without stoppage or slowing-up of the loom. The frequency of changing the shuttles will vary in accordance with the kind of filling being handled and the width of the goods. Preferably the shuttles are supported on a belt or chain carrier on opposite pairs of sprocket wheels 114, 115, the latter being fixed on its shaft 116 to whose outer end is secured a star wheel 117 of a Geneva movement, the pin 118 of the pin wheel 119 splined on a shaft 120 being driven by a sprocket wheel 121, chain 122, and wheel 123 on the shaft 35. When a shuttle is to be changed, the Geneva movement steps the chain forward one link or the distance of one shuttle (herein shown as one-sixth of a revolution, inasmuch as a six-pointed star wheel happens to be illustrated), thereby moving the empty shuttle from the position occupied by the extreme right hand shuttle, Fig. 1, forward and downward to the position occupied by the next preceding link of the chain, so that the discarded shuttle is tipped or dumped off from the chain and received by a shelf or runway 124, which slants rearwardly and downwardly so as to direct the shuttle entirely out of the way and leave room for some more shuttles to be dumped thereon. This movement of the chain brings the next shuttle into the position occupied by the extreme right hand shuttle, Fig. 1, said shuttle being then in line with the lay 125 and beating-up comb 126 along which the shuttle is caused to travel by the arms 68, 69 over the lowered warp threads. The teeth of the comb 126 terminate just short of the path of travel of the lugs 70, 71 of the shuttle, as clearly shown in Fig. 1. At the front side of the lay 125, I provide guards 127 at intervals across the loom for aiding in keeping the shuttle in proper alinement, this being advisable because of the large character of the shuttle, the tension of the relatively unmanageable yarn, and the said engagement of the actuator 68 or 69. Said actuator pushes in one direction on the rear side, while the filling is pulling in the opposite direction on the front side, thereby tending to turn the shuttle out of its course. The guards 127 are sufficiently shorter than the comb 126 so that when the lay is moved forward by its lay swords 128, said guards 127 will pass below the fell so as not to be liable to catch into the fabric at the fell upon the backward return movement.

The chain carriers for the shuttles are composed of a series of shuttle boxes 129 having oppositely projecting ears pivoted together at 130 at each end of the box and, preferably on the forward and inside end of the box next to the loom frame, I provide a spring clip 131 to receive the free end of the filling of the shuttle when the shuttle is put in place and hold said thread during the first traverse of the shuttle.

The shuttle which I have herein shown is specially adapted to the kind of yarn for the handling of which the loom has been invented. Referring to Figs. 10–12, it will be seen that said shuttle 72 consists of a thin light stiff rectangular closure, preferably made of metal and open at its top, the rear wall 132 being high and the forward wall 133 low, with the adjacent corner 134 rounded, so as to permit a lower or shorter shed than would otherwise be possible. The bottom 135 is beveled or inclined upwardly at its opposite ends 136, and adjacent one end of the shuttle on the inside is a bridge piece 137 having a central thread opening 138, having its edges rounded as indicated at 139, through which the thread is passed as indicated by the dotted line 140 and thence through a thread opening 141 in the side 133 of the shuttle, the thread being then led as indicated at 142 behind a bridge piece 143 at the front and preferably at the middle of the shuttle, and thence through an opening 144 in said bridge piece 143, the free end of said thread being secured as already stated in an adjacent spring clip 131, or fastened in any other suitable way so as to insure the proper withdrawing of the thread when the shuttle is positively moved forward by the actuators 68, 69. It is advisable to have this clip yielding in order that the thread may pull out subsequent to the first traverse of the shuttle, said thread being pulled out by the forward take-up movement of the cloth being woven. All the edges of the thread openings and other portions of the shuttle are rounded as clearly shown, to allow the shuttle to move smoother and easier through the yarns and prevent injury to the latter, and the inside of the shuttle is preferably provided with corrugations or ridges 145 to aid in holding in the filling.

At the right hand side of the loom, in line with the travel of the shuttle, is a shuttle box 146 for receiving the shuttle engaged by the actuator 69.

As herein shown, the pin wheel 119 is moved longitudinally on the continuously rotating shaft 120 by a fork 147 which engages a groove 148 in the hub of the pin wheel 119, a usual dwell or locking portion 149 being secured to the right hand face of said pin wheel for locking the star wheel 117 against movement when not engaged by the pin 118 of the pin wheel. The fork 147 is pivoted at 150 on the outer end of a bracket or supporting frame 151 and has a cam lever or dog 152 normally riding in edge engagement with the periphery of a cam wheel 153 against which it is held by a spring 154, said wheel having a notch or depression 155 to permit said spring to actuate the fork 147 at the proper moment to bring the pin wheel 119 into driving engagement with the star wheel 117 long enough to operate the latter one step. The cam wheel 153 is driven step by step, once on every second pick (according to the machine of the drawings) by a pawl 156 in engagement with a ratchet wheel 157 on the same shaft 158 on which the cam wheel 153 is fast. The pawl 156 is reciprocated by a rocker arm 159, link 160, crank 161, rock shaft 162, crank 163, link 164, and cup crank 165 on the left hand end of the shaft 35. A dog or locking lever 166 is normally held by a spring 167 in engagement with notches 168 provided adjacent the edge or rim of the cam wheel 153 for preventing any improper movement thereof. The lay is operated by lay sword connectors 169 and cranks 170 fast on a rock shaft 171 actuated by a cam lever 172 whose cam roll 173 travels in a path cam 174 on the shaft 35. It will be further understood that the loom is provided with usual shipper and detector mechanism, the details of which are not herein shown, the shipper handle 175, however, being shown in connection with a shipper lever 176 from the driving shaft 177 and driving belt 178.

It will be understood that my invention is capable of a wide variety of embodiments inasmuch as, in many particulars, it is broadly new. For example, as to the shuttle shifting operation in connection with the multi-section shedding mechanism, instead of having the actuators 68, 69 move upwardly (as by the wings 106, 107) and permitting them simply to drop by gravity into operative position (as determined by the limiting stops or lugs 179 thereof and the coöperating bracket lugs 180), the direction of the positive movement thereof may be reversed, or instead of having the actuators 68, 69 arranged to operate by an up and down motion and one stationary at times while the other moves, they can both move at the same time and engage the shuttle by an in and out movement under cam control, as illustrated diagrammatically in Fig. 15, where the actuators are indicated at 181, 182, moved transversely of the loom by a carrier 183 and controlled in their movement transversely of said carrier by cam grooves 184, 185, 186, 187 and switches 188, 189, 190, 191, whereby the actuators are given the same engaging and disengaging movement with relation to the shuttle as the actuators 68, 69.

In operation, the shuttles are first filled by having the cop or other yarn body forced down into proper position within the shuttle 72, the free end of the shuttle yarn being led through the openings 138, 141, and 143, as shown in Fig. 10, and then caught in the clip or detent 131 of the adjacent shuttle box on the shuttle carrier in the loom. The warp threads are inserted in the loom, as shown in Fig. 4, whereby one section of the harness provides a cross shed while the other section provides an open shed. Supposing, therefore, that the open shed is in the left hand section of the loom, as shown in Figs. 3 and 3ª, and that the shuttle is in weaving position, as shown in Fig. 1. The rock shaft 104 is turned to the position shown in Fig. 1, thereby permitting the actuator 68 to engage the shuttle between the lugs 70, Fig. 3, and the cable 76 thereupon instantly, through said actuator 68, moves the shuttle through the open shed to the right, Figs. 3 and 3ª, until the actuator reaches approximately the right hand end of said open shed, whereupon the rock shaft 104 rocks in an opposite direction so that its wing 107 raises the actuator 68 and the wing 106 simultaneously drops the actuator 69, which engages the forward end of the shuttle between the lugs 71 and continues the forward movement of the shuttle through the crossed shed, said actuator 69 being moved by its cable 77. While this movement of the actuator 69 is taking place, the actuator 68 is returned in an opposite direction to the left until it arrives outside of the harnesses at about the same time that the other actuator and the shuttle complete their movement to the right outside of the harnesses. The strand of weft filling is then beaten up by the comb 126, and as this is taking place, the harnesses reverse their position, forming a crossed shed at the left hand section of the loom and an open shed at the right hand section, being actuated by the cams shown in Figs. 16–19. The shuttle driving operation is then repeated, excepting that the shuttle starts at the right hand side of the loom where it is still engaged by the actuator 69, which remains in engagement between the lugs 71 thereof until said actuator arrives at approximately the middle of the loom, i. e. at the left hand end of the open-shed section (in the two shed-section loom of the drawings), whereupon said actuator 69 releases the shuttle and the actuator 68 simultaneously engages the shuttle and continues the movement thereof through the crossed shed or left hand section of the loom until the shuttle arrives at its starting point as shown in Fig. 3. The beating up operation is then repeated. At the same time, for convenience, the actuator arm 68 moves up away from its shuttle and then down again, this movement preferably taking place at the end of each return movement of the shuttle in order that when a shuttle changing movement takes place the actuator 68 will be out of the way of the shuttle. The aforesaid weaving movements continue for the predetermined number of shots of filling, one hundred and seventy six in the present loom, whereupon the Geneva movement 117, 118, etc., operated through the pawl and ratchet 156, 157 and the cam wheel 153 actuating by its cam depression 155 the parts 152, 147, 148 to engage the pin 118 with the star wheel 117, thereby positively advancing the shuttle boxes so as to discharge the empty shuttle and bring a filled shuttle into weaving position. Thereupon the new shuttle is driven positively forward to lay a strand of weft thread, the free end of the latter being held by the adjacent clip 131 while the shuttle makes its traverse, and so remaining held until the stress of the weaving, the movement of the woven fabric to the take-up roll, or the subsequent movement of the shuttle changer mechanism, causes said free end to escape from the clip or detent 131. It will be observed that all the movements are positive.

I am convinced that one of the principal causes of the difficulties experienced in weaving this heavy class of fabrics, in which uneven, kinky, coarse, stiff fiber is employed, sometimes intertwisted with one or more wires, has been due to the sudden movements and lack of positiveness of movement provided for weaving in the looms heretofore provided for weaving gunny, burlap, cocoa matting, etc. The clumsy character and stiffness of the filling body has still further increased this difficulty. By doing away with the picker stick movement, much of the sudden jerky strain on the weft yarn has been eliminated, and by providing the positive continuous engagement of the shuttle by a mover or actuator which directly propels the shuttle in its entire weaving movement, it becomes possible to give the shuttle an easy and perfectly uniform movement. This aids further in giving the loom a relatively high speed, inasmuch as the weaving movement, although positive, is continuous and uniform. A further feature of great practical importance in handling this difficult filling resides in providing an automatic shuttle feeding mechanism and shuttle changer. Notwithstanding the fact that the shuttle is a positively driven shuttle, I have succeeded in devising a mechanism whereby this kind of a shuttle can be changed (as distinguished from always retaining the same shuttle in the loom and simply changing the filling supply). Moreover, this changing, whether merely of the filling or of both the filling and the shuttle, takes place without stopping or slowing up the loom. Also the successive shuttles are positively fed to the loom. This takes place by a single or one-step movement, which same movement not only brings the new shuttle into place but discharges the old shuttle, i. e. by this single-step movement the change is effected. Again, there is no pushing movement on the shuttles either into place or out of place, but they are simply fed in and fed out, and the movements are all in a forward direction (i. e. there are no backward movements),—all these features, both singly and collectively, being of importance and understood to be novel. The construction and arrangement of the harnesses is another important feature, which has been largely explained already. A further advantage thereof not previously mentioned, is that special strain and seesawing action of the thread-eye fingers upon the warp threads is eliminated and also there is no necessity for easers, give-away whip rolls or the like (in my preferred construction). By having the top of the rod 5, where the upper groups of warp threads pass to the rods 13, 14, substantially midway of the range of movements of said two rods, the tension of the warp threads remains substantially the same without requiring any sawing back and forth of the warp threads through their supporting eyes as the latter are moved up and down by the harnesses. Also, because of the harness arrangement and movement, the warp threads do not continually move from the bottom of the warp eye to the top and vice versa, but remain continually in engagement with the same side or edge of the eyes. What has been said in regard to the rod 5 is true of the rod 6 with relation to the lower harness members. This arrangement of the warp threads also provides a large open space entirely across the loom for the track 75 and all the parts mounted thereon and connected therewith, so that they can coöperate to the best advantage with the open shed section of the loom. The open shed extends preferably from the fell back to the tension devices 1, 2 inasmuch as the supporting means 5, 6 and said tension devices coöperate with the harness mechanism (when in the open shed position) to divide the warp threads into upper and lower groups which are held open by said mechanism from the fell back to the rear end of the loom. It will be noted, also, that the harness is located close behind the shuttle path or filling-laying portion of the shed, so that when the harnesses are moved to crossed-shed position, the crossed warp threads extend approximately perpendicular to the top and bottom of the shed, i. e. to their respective upper and lower shed portions of the warp threads which are respectively above and below the shuttle path or path along which the filling is laid. In other words, the shedding mechanism or harness members are so close to the shuttle guiding members, particularly the lay 125 and comb 126, that, in their vertical movement, they deflect the warp threads to substantially vertical positions. In this connection, it may be well to point out that the short rigid guides 36 coöperate with the harness members in giving the latter such unvarying accuracy of vertical movement with relation to the teeth of the comb 126 that the warp threads are thereby invariably caused to reënter (for the beating up operation and to form the bottom of the shed) the same comb spaces which they left to form the upper shed or top part of the shed.

Having described my invention, what I claim as new and desire to secure by Letters Patent is:

1. In a loom, harness mechanism extending across the loom and arranged to operate in a plurality of sections alternately transversely of the loom, operating mechanism to operate said harnesses alternately in said plurality of sections, and filling-delivery mechanism, including means entering within an open shed lengthwise of the loom for positively moving said filling through the shed formed by said harness.

2. In a loom, harness mechanism arranged to operate in two sections transversely of the loom, including means for operating one section of said harness to form an open shed and means for operating the other section of said harness to form a crossed shed, a shuttle, and operating mechanism for the shuttle, including means wholly external of the crossed shed for moving the shuttle therethrough and means entering within the open shed for moving the shuttle through the open shed.

3. In a loom, means for supporting the warp threads, including means adjacent one portion of the loom for supporting the woven fabric, and supporting and tension means for the warp threads at an opposite portion of the loom, harness mechanism arranged to operate in a plurality of sections transversely of the loom, and operating mechanism for said harness, including means for moving the harness in one section to open-shed position when the other section is in cross-shed position, and means for operating said other section in cross-shed position when the first mentioned section is in open-shed position, said loom having a construction maintaining the warp threads, when in said open-shed position, entirely separated from each other in groups extending from the fell upwardly and rearwardly to said supporting and tension means and from the fell downwardly and rearwardly to said supporting and tension means, said construction forming an open unobstructed space between said separated groups.

4. In a loom, means for supporting the warp threads, including means adjacent one portion of the loom for supporting the woven fabric, and supporting and tension means for the warp threads at an opposite portion of the loom, harness mechanism arranged to operate in a plurality of sections transversely of the loom, and operating mechanism for said harness, including means for moving the harness in one section to open-shed position when the other section is in cross-shed position, means for operating said other section in cross-shed position when the first mentioned section is in open-shed position, said loom having a construction maintaining the warp threads, when in said open-shed position, entirely separated from each other in groups extending from the fell upwardly and rearwardly to said supporting and tension means and from the fell downwardly and rearwardly to said supporting and tension means, and shuttle operating mechanism located to operate transversely of the loom between said separated upper and lower groups of warp threads.

5. In a loom, means for supporting the warp threads, including means adjacent one portion of the loom for supporting the woven fabric, and supporting and tension means for the warp threads at an opposite portion of the loom, harness mechanism arranged to operate in a plurality of sections transversely of the loom, and operating mechanism for said harness, including means for moving the harness in one section to open-shed position when the other section is in cross-shed position, means for operating said other section in cross-shed position when the first-mentioned section is in open-shed position, said loom having a construction maintaining the warp threads, when in said open-shed position, entirely separated from each other in groups extending from the fell upwardly and rearwardly to said supporting and tension means and from the fell downwardly and rearwardly to said supporting and tension means, a shuttle operable in the shed on the side of the harness adjacent the fell, and actuating mechanism for said shuttle movable between said upper and lower groups of warp threads at the rear of said harness and provided with shuttle engaging means for operating on the shuttle in the open-shed section.

6. In a loom, means for supporting the warp threads, a harness mechanism arranged to operate in sections across the loom, including means for moving the harness in one section to cross-shed position with the crossed warp threads extending approximately perpendicular to the respective upper and lower shed portions of the warp threads at the filling-laying portion of the shed, and shuttle actuating mechanism located to operate just back of said perpendicular threads.

7. In a loom, a shuttle, combined with operating mechanism for said shuttle located between the upper and lower warp threads of the shed and having means extending lengthwise of the loom into the shed and movable transversely of the loom and within said shed for positively moving the shuttle part way across the loom, and other means for moving the shuttle another portion of the way across the loom.

8. In a loom, means for supporting the warp threads, means for separating said warp threads into a shed, a shuttle shorter than the width of the fabric being woven, and means extending forwardly from behind the shedding means for positively moving the shuttle through said shed across the loom.

9. In a loom, means for supporting the warp threads, means for separating said warp threads into a shed, a shuttle shorter than the width of the fabric being woven, and means located in the midst of the loom and having a portion extending lengthwise of the loom into the shed and movable through the shed transversely of the loom for intermittingly engaging the shuttle and propelling the shuttle through the shed.

10. In a loom, shedding mechanism, a shuttle shorter than the width of the fabric being woven provided with shifting means to be engaged by operating devices therefor, an operating device for engaging the shuttle shifting means and shifting the shuttle part way across the loom, a second operating device for then engaging the shuttle shifting means and shifting the shuttle further across the loom, actuating mechanism for moving said devices into engagement with said shifting means of the shuttle at predetermined points and times in the loom, means for automatically discharging the shuttle after a predetermined number of weaving movements, and means to deliver in timed relation to the operations of said operating devices and to said predetermined number of weaving movements, a fresh shuttle with its shifting means in accurate predetermined position with relation to the shed and to said first mentioned shuttle operating device.

11. In a loom, shedding mechanism arranged to operate the shed in a plurality of sections transversely of the loom, including means for operating one section to form an open shed and means for operating an adjacent section to form a crossed shed, a source of supply of fresh shuttles, means traveling across the loom and extending lengthwise of the loom into the open shed in engagement with a weaving shuttle for positively moving the latter transversely of the loom, and mechanism for automatically discharging said weaving shuttle after a predetermined number of weaving movements and for replacing the discharged shuttle with a fresh shuttle from said source of supply, including operating means to operate said shuttle supply to deliver said fresh shuttle in accurately timed and positioned relation to all the aforesaid moving parts of the loom after said predetermined number of weaving movements.

In testimony whereof, I have signed my name to this specification, in the presence of two subscribing witnesses.

THOMAS P. WALSH.

Witnesses:
GEO. H. MAXWELL,
THOMAS F. LYDON.